(12) United States Patent
Saltz

(10) Patent No.: US 7,158,989 B2
(45) Date of Patent: Jan. 2, 2007

(54) LIMIT ENGINE DATABASE MANAGEMENT SYSTEM

(75) Inventor: Ivan Saltz, Fort Lauderdale, FL (US)

(73) Assignee: BUC International Corporation, Fort Lauderdale, FL (US)

( * ) Notice: Subject to any disclaimer, the term of this patent is extended or adjusted under 35 U.S.C. 154(b) by 151 days.

(21) Appl. No.: 10/046,683

(22) Filed: Oct. 26, 2001

(65) Prior Publication Data

US 2002/0169765 A1    Nov. 14, 2002

Related U.S. Application Data

(60) Provisional application No. 60/244,574, filed on Oct. 27, 2000.

(51) Int. Cl.
*G06F 17/30* (2006.01)

(52) U.S. Cl. .......................... 707/102; 707/3

(58) Field of Classification Search .............. 707/1–10, 707/100–104.1, 200–205
See application file for complete search history.

(56) References Cited

U.S. PATENT DOCUMENTS

| | | | | |
|---|---|---|---|---|
| 6,012,053 A | * | 1/2000 | Pant et al. | 707/3 |
| 6,574,632 B1 | * | 6/2003 | Fox et al. | 707/102 |
| 6,611,834 B1 | * | 8/2003 | Aggarwal et al. | 707/10 |
| 2002/0099605 A1 | * | 7/2002 | Weitzman et al. | 705/14 |

* cited by examiner

*Primary Examiner*—Mohammad Ali
(74) *Attorney, Agent, or Firm*—Manuel Valcarcel, Esq.

(57) ABSTRACT

A database management system utilizing a limit engine to provide ranked search results in response to search queries directed to a database that includes database data that matches the specific database user query as well as data that is within a programmable range of data relevant and responsive to said search queries. A method for providing ranked database search query results according to similarity of database objects to search query criteria, within a programmable range of deviation, is also disclosed and claimed.

6 Claims, 2 Drawing Sheets

LIMIT ENGINE DATABASE MANAGEMENT SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

PRIOR U.S. APPLICATION

This Specification is based on U.S. Provisional Application Ser. No. 60/244,574 filed on Oct. 27, 2000. The inventor claims the benefit of Title 35, Section 119 of the U.S. Code based on said provisional application.

BACKGROUND OF THE INVENTION

1. Field of the Invention

The present invention is in the field of database systems. More specifically, the present invention relates to a database management system utilizing a limit engine.

2. Description of Background Art

Database Systems and Queries

The following terms are used in the field of database systems design and are used in this application.

A database management system ("DBMS") holds information in the form of a table of rows also known as records, or tuples; each tuple contains a set of columns. In relational databases, each column, or field, holds a specific attribute value for the record. Object-oriented databases ("OOD") are not organized in a two-dimensional array, but still, each object has values which are associated with a particular attribute of the object.

"Queries" are requests made by an application program to the DBMS to return one or more of the attributes of zero or more of the rows (or objects) from one or more tables meeting certain conditions, both between the tables and within the tables. Taken together these operations are called, generically, "restrict, select and join."

If the DBMS is a relational DBMS, the most common language for making queries is called structured query language ("SQL"). The "select" operation finds one or more rows from a table or "joined" tables which meet a certain criteria, known as a qualification clause in the SQL language. However, the same principal of finding objects which meet certain qualifications applies to other forms of DMBSs.

Databases today are stored in high density media, most often hard disk drives, but also CDROMs, optical disks and other media attached to computers. The larger the databases become, the more critical is the requirement that queries are executed efficiently. When databases are very large, such as in data warehouses, for example, the execution of the query takes a significant amount of computing, memory and disk resources. In some applications, many users are simultaneously attempting to fetch many rows according to widely varying qualification clauses. If the DBMS engine, which fetches the rows, had to inspect every row of the database and calculate the qualification clause, the system response would be painfully slow no matter how fast the computer and disk drive are.

Fortunately, the art of query optimization and data indexing is very advanced. There are many patents and papers which cover this subject. Patents in the field include U.S. Pat. Nos. 6,021,405, 4,774,657, 4,956,774. The underlying premise behind the systems taught by those patents, however, is that the qualification clause is "known" at the time of the query. This invention is concerned with the area of determining a "good" qualification clause in response to a user's real question.

Query Result Ranking

There are many applications where ranking of the result set from a database search is important. Most of the work in this area has been done with documents (text) and images. With documents, a system might index the documents according to a keyword(s) or according to the appearance of particular words or phrases as they might correlate to a dictionary or thesaurus specific to the application. So, for example, a database of pathology articles might be indexed according to a specific dictionary of medical terms, like "immunoglobulin" or "hypersensitivity." A search typically returns a set of documents that include all (or some) of the keywords that the user has requested. Then, there are various techniques to display the documents to the user in an order which, in the context of the application program, are from the most relevant to the least relevant.

Other examples include typical Internet web search engines, which accept text queries and return a result set of links to web pages. Most, if not all, of the Internet search engines rank the documents by scoring the relevance of the document to the user's search phrase. The actual relevance ranking algorithm depends on the search engine. Different scoring techniques are used, including some which may score pages higher for companies that have paid a fee to appear higher in the list of results.

Parametric Data

Databases, whether they are relational, object-oriented or some other structure, have the characteristic that the objects themselves contain atoms of attribute-value combinations. In the relational model, these attribute-value atoms are pairs in the sense that one attribute may contain one and only one value. The attribute-value pair constraint does not necessarily hold for OOD systems, but objects still have the character that they contain attribute-values.

When real-world objects are being represented in the database, these attribute-values can be viewed as the parametric features of the underlying physical object. Cars, for example, can be described with parameters that take on discrete values, such as color, integral values, such as the number of doors, and continuous values, such as weight or wheelbase. In another example, a book database might be described with such parameters as the number of pages, the kind of binding, the name of the author, and the year of the copyright.

These parameters, in a relational DBMS, usually end up being the columns or fields in a database table. They are then used in database queries to select rows which correspond to underlying objects with certain characteristics. For example, if a dealer wanted to inquire about the availability of green cars in his inventory that had two doors, the SQL version of the query might be "select* from car_inventory where doors=2 and color='green'."

In case the database warehouse is large, and the query inexact, the number of rows returned might be extremely large. Then the process of ranking the results is expensive in terms of computer operations and, perhaps, slow and not useful. This invention solves the problem for data warehouses whose objects have, or can be made to have, parametric features. The database management system of the present invention limits the search space by predicting the size of the result set.

SUMMARY OF INVENTION

Utilizing the database management system of the present invention, a user makes a request from a database application to search for an object having a particular specification. The user inputs the specifications through an input device. Instead of using the specifications to write or translate the requirements into a SQL or other language query, the invention has a "limit engine." The limit engine uses knowledge about the distribution of the database in order to fetch all objects which are immediately "surrounding" the user's ideal object. The term "surrounding" is a function of the application designer's decision about how many objects returned is reasonable, and of the distribution of objects in the database. For example, if the user is searching a hardware catalog for a ladder that is 12 feet tall, the limit engine may translate that request into a query that searches for ladders that are between 10 feet and 14 feet. This has the advantage that the user does not have to know the exact size of something, or make repeated searches with different sizes, in order to get meaningful results. The invention can work just as well with categorical variables providing that the application designers have a way to express similarity between the different categorical values.

DESCRIPTION OF PREFERRED EMBODIMENT

The invention has a method for ranking the results according to how close a database object fits the user's requirements or target. In theory, every object in the database could be ranked against the user's target, even though some of them are so far afield as to not be a reasonable guess. So, for example, if a user searching a marine vessel database with the present invention asked to find a 52-foot motor yacht, it would seem ridiculous to display an 8-foot rowboat with a "match score" of zero.

In a brute force search, the entire data warehouse would have to be ranked. The application program could then order the results and put the worst scoring ones at the end of the list. Alternatively, the system could be programmed to stop displaying results when the match score drops to a certain low level. Such a wholesale ranking process can be expensive and time consuming in terms of computing resources. Another major disadvantage of the brute force search and rank is that it fails to take advantage of today's modern and powerful DBMSs which have advanced optimization algorithms that speed database operations when the query qualification clause is restrictive.

The Limit Engine

In this invention, there is a "limit engine" (7) which sets the database qualification clause. The limit engine is set to return a "reasonable" number of records. Without the limit engine, an SQL query might be "select* from boats where length=52." (The other alternative, already mentioned, is to inspect the entire database.) If there were no boats that were exactly 52-feet long, but there were boats that were 51 or 53 feet, then such a query is a disservice to the user and makes for a poor search application. In the preferred embodiment of this invention, the application will return not only the 52-foot boats, but perhaps also, the 51- and 53-foot boats. Of course, the boats which are not exactly 52 feet will appear lower down in the ranked list.

Figure 1:
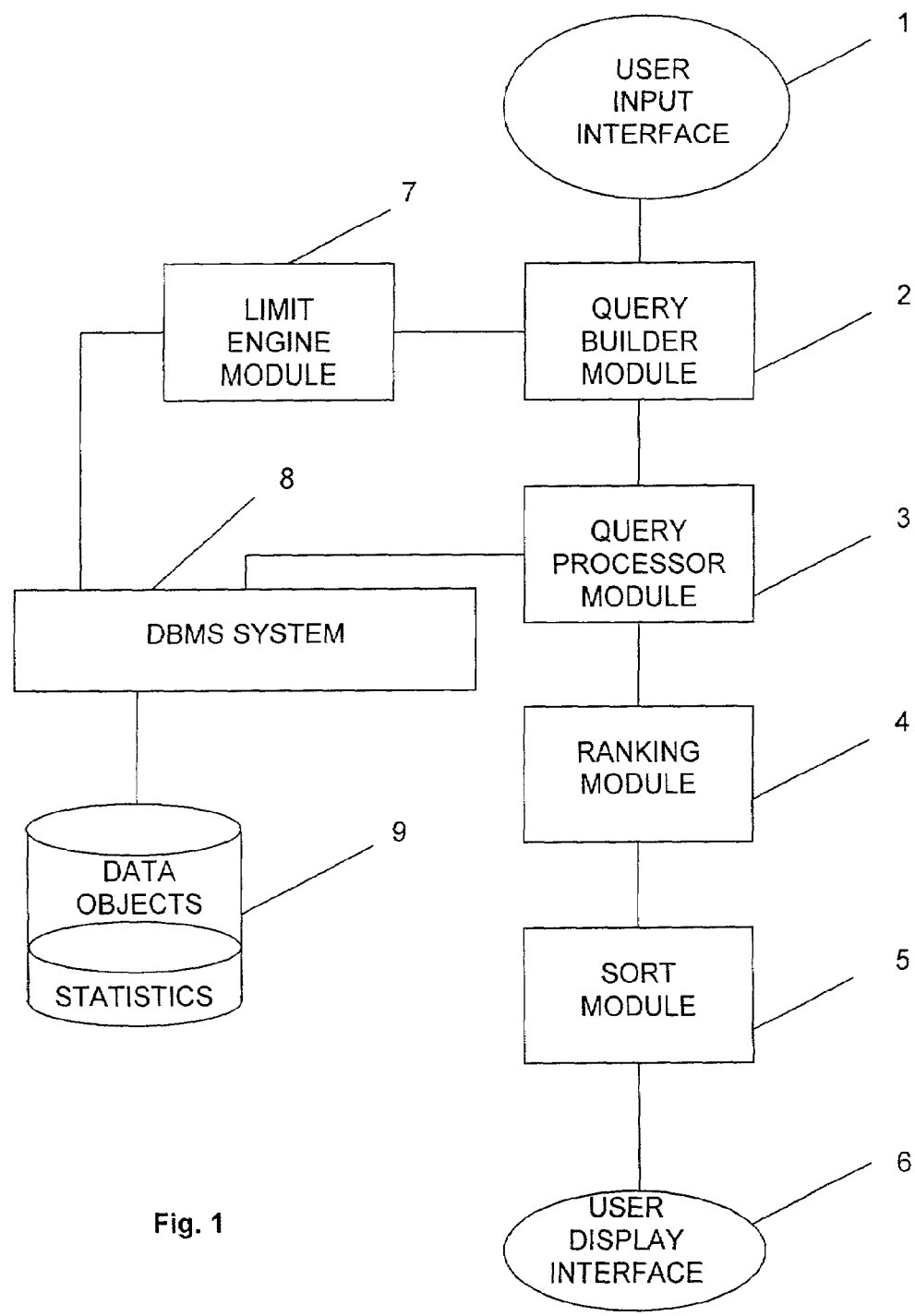
FIG. 1 is a block diagram describing components of the system of the present invention in a preferred embodiment.

Referring now to FIG. 1, in the example application, the database contains records with information, for example, but not by way of limitation, about boats for sale. The records are data objects which hold a complete description of a marine vessel, including some textural descriptions. However, many of the fields describing the underlying object are parametric. For example, the length, beam and weight displacement of the vessel are all continuous measures. The boat type (sedan, yacht, open fisherman) is a discrete parameter. The number of engines which power the boat is an integral parameter.

The system, in a preferred embodiment, comprises a database 8 containing data items/objects 9; a user input interface 1 for receiving database queries from users of the particular database; a limit engine module 7 interfacing with said database responsive to said user input interface 1 for expanding the database user's query for specific data to include data within a programmable range of deviation from said database user query; a query builder module 2 responsive to said limit engine module 7 for formulating a database search query for database data within said range of deviation supplied by said limit engine module 7; a query processor module 3 responsive to said query builder module 2 for processing said database search query formulated by said search query builder module 2; a ranking module 4 responsive to said query processor module 3 for ranking database data within range of deviation according to how closely said data matches said database user's original query for specific data; a sort module 5 responsive to said ranking module 4 for sorting said ranked database data into descending order based on the rank assigned to each data item within said range of deviation by said ranking module 4; and a user display interface 6 responsive to said sort module for displaying said ranged and sorted data to said database user.

The present invention is also a method for providing ranked database search query results according to similarity of database objects to search query criteria within a programmable range of deviation, comprising the steps of: receiving a database user query input for specific data; expanding said query input to include data within said programmed range of deviation from said query; formulating a database search query for database data within said programmed range of deviation; processing said database search query for database data within said programmed range of deviation; ranking database data within said programmed range of deviation according to how closely said data matches the user's query for specific data; sorting said ranked database data into descending order based on the rank assigned to each data item within said programmed range of deviation; and displaying said ranked and sorted data to the database user.

Referring to FIG. 1, the user submits (1) a query to the system which is a description of a particular boat that he wants to buy. This description is called the ideal or "target" boat. That the user has, and can ask for, an ideal target is crucial to the invention, although the underlying object does not have to be a boat. Other possibilities, without limitation, include an ideal house described by number of bedrooms, number of bathrooms, price, square feet of living area, and distance from landmarks; the ideal car described by style, number of doors, and color; the ideal airplane described by cruising distance, number of engines, number of passengers and selling price. Needless to say, every industry can apply this invention in any situation where the user needs to find the closest match to an ideal target request.

Given the user's target query and knowledge about the database, the limit engine (7) sends input to the query builder (2) which writes the qualification clause for the SQL statement that will be used to query the database. In its simplest form, the limit engine strategy might be to apply a fixed percentage to the target parameter. As an illustrative example, using 5% as a limit rule, the SQL query might be rewritten as "select* from boats where length between 49.4 and 54.6." This SQL query will then include boats that immediately surround (in the search domain) the user's ideal target. This qualification clause is written by the query builder (2) after it consults with the limit engine (7). This query is then sent to the query processor (3), which sends the SQL to the DBMS and retrieves the result set of records. The result set is then passed to the ranking module (4). The purpose of the ranking module (4) is to assign a score to each record which represents how close the returned record matches the user's target. In the example given, if the returned record represents a boat which is exactly 52 feet in length, the search score is 100%. There are many techniques used to evaluate "distance" from a target in a search domain. For the purpose of demonstration, we might in this example assign a ranking score of score=100%*exp (−(length−52)**2/52);

The records, which have been ranked in the ranking module, are then sent to the sort module (5) which puts them in descending order by score, and then passes them to the user display (6) so that the most relevant records appear on the top of the list shown to the user.

Prior to this invention, there were three possible ways to resolve the user's query. First, every single record in the data warehouse could have been ranked, but that is very costly in computing resources. Second, only the exact matches to the user's target description could have been returned, but that might return no answer. Third, the user could specify the ranges for all the parameters, but again, that might return way too many records, or way too few records as to make the application unhelpful. This invention solves the problem. By the use of the limit engine (7), the DBMS does not have to visit every record of the database, but still gives the user a reasonable choice of answers.

In the foregoing discussion, the limit engine was simplified to create a range from the user's target description by adding and subtracting a percentage to the target parameter. In truth, the limit engine may be much more complex than that. The limit engine has access to knowledge about the database. For example, such knowledge might be statistical distributions of the parameters of the objects. Such distributions could be internally represented by shape and key parameters or moments. Another possibility is to construct histograms of the parameters of the underlying objects. These statistics and histograms may be stored in the data warehouse (9) itself, or stored locally within the limit engine as a knowledge base. Knowledge may be stored in other forms, including joint distributions and similarity indexes.

Figure 2:
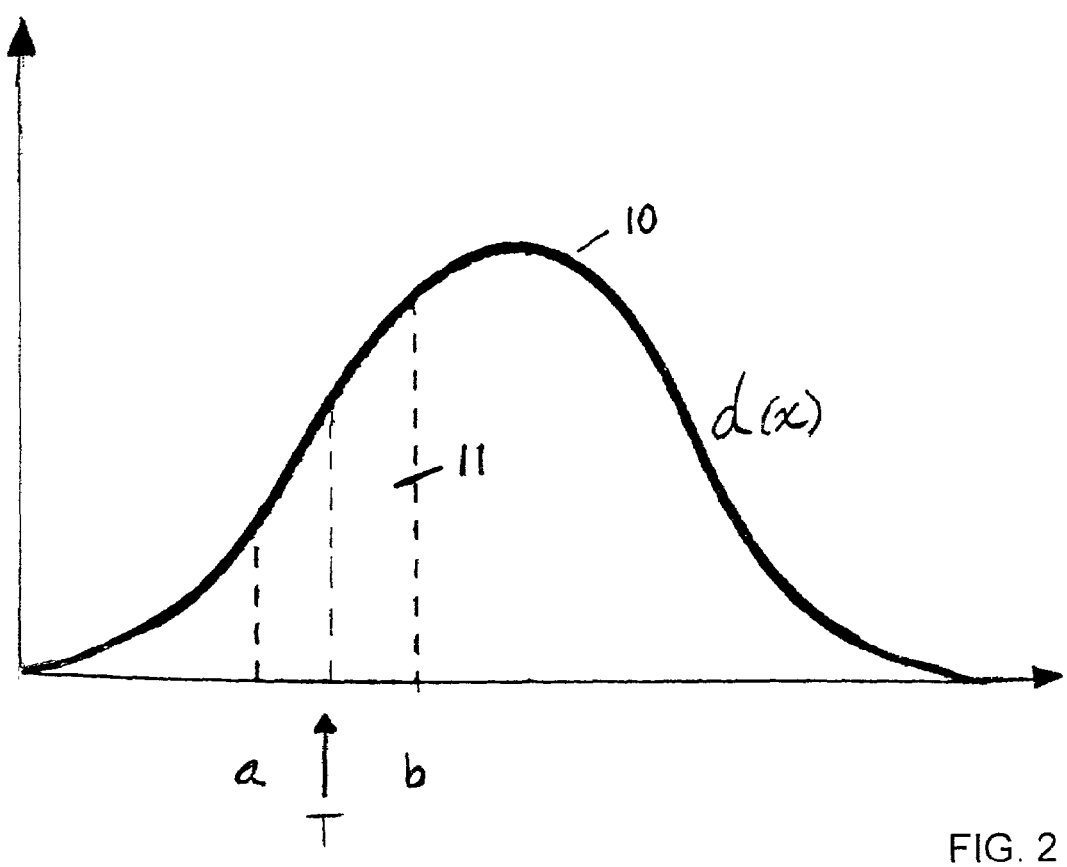
FIG. 2 is a graphical representation of a statistical distribution that can be utilized in the system of the present invention in a preferred embodiment.

The application of the statistical distribution of a parameter of the data in the warehouse is self-explanatory to mathematicians. Referring to FIG. 2, "x" represents a parameter of the underlying object, such as length of the boat in the example application of the preferred embodiment. The distribution of lengths in the database is estimated by a continuous function d(x). Suppose that the user requests a search for a particular target value, "T". Then the application program merely solves the integral of the function d(x) for limits a and b, such that the area under the curve (11) represents a "reasonable" percentage of the data population. What is "reasonable" is determined by the designers and marketers of the application itself.

By way of further instruction in this art, suppose the database contains boats for sale, and one of the parameters is length of the boat. The knowledge about this database could be that the distribution of boats in the database is normal with a mean of 30 and standard deviation of 10. Suppose the user wants to buy a boat that is 35 feet long. If the application designers have decided that a reasonable number of records to return is 50, then the limit engine (7) will use the normal curve to estimate that, with a database of 1000 records, the length limits of the query should be 34.3 to 35.8; and the SQL query written by the query processor (3) will then be "select* from boats where length between 34.3 and 35.8." In this calculation, the strategy was to choose equal areas under the curve (11) on either side of the target value, T, but other strategies could be used such as equal distances, T-a and b-T.

Other possibilities for implementing the limit engine (7) algorithm is to use a sum over a histogram. In fact, many of the well-known techniques used in DBMS statistical query optimization can be applied to develop limit engine (7) algorithms. The difference between that art and this invention, however, is that the limit engine (7) is used in conjunction with the query builder (2) to rewrite the SQL, or other query language understood by the DBMS, qualification clause. Whereas with DBMS optimizers, the statistics are used to develop a plan for fetching records from the physical media, they are used in this invention to develop a logical search space given the user's target ideal.

Categorical parameters can be handled using a similarity matrix and a histogram of the distribution of the values. Given a particular target value for a categorical variable, the limit engine (7) can, in a loop, add the histogram percentage for each value starting with the target and proceeding from most similar values to least similar values until the sum meets or exceeds the "reasonable" percentage of the total population.

Ranking Module

The ranking module, although optional, makes the invention more useful. Given some target description to search, the data warehouse may, in fact, contain and return exact matches which should then show up first in the user display (6).

In general, the ranking or score for an individual record is the normalized, weighted sum of the proximity measures for each parameter, as in:

$$\sum_i Wi * Ci$$

where $w_i$ is the weight for the $i^{th}$ parameter and $C_i$ is the proximity measure. The $C_i$ proximity measure is a normalized value with 1 being an exact match to the target value for the $i^{th}$ parameter, and 0 representing the worst or most distant match. The weights, $w_i$, are assigned by the application program. (Alternatively, they may be assigned by the user, similar to U.S. Pat. No. 6,012,053 to Computer system with user-controlled relevance ranking of search results.)

The actual technique for calculating the proximity measures, $C_i$, is well-known in the art of classification and clustering.

While the present invention has been shown and described herein in what is considered to be a preferred embodiment there of, illustrating the results and advantages over the prior art obtained through in the present invention, the invention is not limited to the specific embodiments described above. Thus, the forms of the invention shown and described herein are to be taken as illustrative and other embodiments may be selected without departing from the spirit and scope of the present invention.

What is claimed is:

1. A database management system for use with a searchable computerized database, comprising:
    a database containing data items;
    a user input interface for receiving database queries for specific data from users of said database;
    a limit engine module, interfacing with said database for revising a database user's query for specific data to include data within a programmable range of deviation from said database user query, said revision being accomplished via a pre-selected algorithm without further user-supplied parameters being required;
    a query builder module responsive to said limit engine module for formulating a database search query for database data within said range of deviation supplied by said limit engine module;
    a query processor module responsive to said query builder module for processing said database search query formulated by said search query builder module;
    a ranking module responsive to said query processor module for ranking database data within said range of deviation according to how closely said data matches the database user's query for specific data;
    a sort module responsive to said ranking module for sorting said ranked database data into descending order based on the rank assigned to each item within said range of deviation data by said ranking module; and
    a user display interface for displaying the results of said database search query processed by said query processor module to the database user.

2. The database management system of claim 1, wherein said limit engine is programmed to expand a database user's query for specific data to include data within a fixed percentage of deviation from the database user's query.

3. The database management system of claim 1, wherein said limit engine is programmed to expand a database user's query for specific data to include data within a fixed statistical standard deviation of data within said database from the database user's query.

4. A method for providing database search query results according to similarity of database objects to search query criteria within a programmable range of deviation, comprising the following steps:
    receiving a database user query input for specific data;
    revising said user query input, said revision being accomplished automatically via a pre-selected algorithm without further user-supplied parameters being required, to include data within a programmed range of deviation from said user query;
    formulating a database search query for database data within said programmed range of deviation;
    processing said database search query for database data within said programmed range of deviation;
    ranking database data within said programmed range of deviation according to how closely said data matches the user's query for specific data;
    sorting said ranked database data into descending order based on the rank assigned to each data item within said programmed range of deviation; and
    displaying the results of said database search query to the database user.

5. The method of claim 4, wherein said step of revising said user query input to include data within a programmed range of deviation from said user query comprises expanding said query to include data within a fixed percentage of deviation from said user query.

6. The method of claim 4, wherein said step of revising said user query input to include data within a programmed range of deviation from said user query comprises expanding said query to include data within a fixed statistical standard deviation of data within said database from said user query.

* * * * *